(12) United States Patent
Susnjara

(10) Patent No.: US 6,350,222 B2
(45) Date of Patent: *Feb. 26, 2002

(54) MACHINE TOOL WITH IMPROVED TOOL CHANGER MEANS

(75) Inventor: Kenneth J. Susnjara, Birdseye, IN (US)

(73) Assignee: Thermwood Corporation, Dale, IN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,113

(22) Filed: Jul. 28, 1999

(51) Int. Cl.[7] ................ B23Q 3/157; G06F 19/00
(52) U.S. Cl. ............ 483/1; 483/5; 483/9; 483/50; 483/51; 483/63; 700/179
(58) Field of Search ................ 483/1, 4, 5, 7, 483/8, 9, 10, 11, 38, 47, 50, 51, 64, 6, 63; 700/179, 173, 175, 169

(56) References Cited

U.S. PATENT DOCUMENTS

| | | | | |
|---|---|---|---|---|
| 3,823,466 A | * | 7/1974 | Jerue | 483/8 |
| 3,990,140 A | * | 11/1976 | Polacek et al. | 483/38 |
| 4,109,188 A | * | 8/1978 | Shima et al. | 483/9 |
| 4,237,598 A | * | 12/1980 | Williamson | 483/4 |
| 4,497,029 A | * | 1/1985 | Kiyokawa | 700/175 |
| 4,549,270 A | * | 10/1985 | Fukumura et al. | 700/179 |
| 4,581,810 A | * | 4/1986 | Kawakami et al. | 483/1 |
| 4,635,342 A | * | 1/1987 | Balding | 483/7 |
| 4,716,647 A | * | 1/1988 | Winkler et al. | 483/14 |
| 4,739,488 A | * | 4/1988 | Asakura | 483/5 |
| 4,809,426 A | * | 3/1989 | Takeuchi et al. | 365/64 |
| 4,866,835 A | * | 9/1989 | Novak | 483/63 |
| 4,920,632 A | * | 5/1990 | Babel | 483/64 |
| 5,189,624 A | * | 2/1993 | Barlow et al. | 700/169 |
| 5,257,199 A | * | 10/1993 | Tsujino et al. | 483/4 |
| 5,274,562 A | * | 12/1993 | Suzuki | 483/11 |
| 5,378,218 A | * | 1/1995 | Daimaru et al. | 483/9 |
| 5,514,063 A | * | 5/1996 | Stoll et al. | 483/38 |
| 5,624,365 A | * | 4/1997 | Haninger et al. | 483/50 |
| 5,772,566 A | * | 6/1998 | Schweizer et al. | 483/47 |
| 5,860,901 A | * | 1/1999 | Haninger et al. | 483/47 |
| 5,908,374 A | * | 6/1999 | Kato | 483/1 |

FOREIGN PATENT DOCUMENTS

| | | | | |
|---|---|---|---|---|
| JP | 61-50733 | * | 3/1986 | 483/63 |
| JP | 61-86153 | * | 5/1986 | 483/5 |
| JP | 62-152635 | * | 7/1987 | 483/8 |

* cited by examiner

Primary Examiner—William Briggs
Assistant Examiner—Erica E Cadugan
(74) Attorney, Agent, or Firm—Lalos & Keegan (57) ABSTRACT

A tool changer for a machine tool having a toolhead assembly including a spindle with a device detachable securing a tool thereto, generally consisting of at least one device for holding a tool detachably securable to the spindle, pivotally connected to the assembly and angularly displaceable in a plane including the axis of the spindle between a retracted position and an extended position for transferring a tool between the tool holding device and the spindle; and a device for angularly displacing the tool holding device between such retracted and extended positions.

20 Claims, 8 Drawing Sheets

```
M80L1
G04F.6
[SWAPTOOL 2,5,5,1,5,5] (GETS T5 from Bulk reassigns to ATH
M0
G04F.6
[SWAPTOOL 2,4,4,1,4,4] (GETS T4 from Bulk reassigns to ATH
M0
 G04F.6
[SWAPTOOL 2,3,3,1,3,3] (GETS T3 from Bulk reassigns to ATH
M0
G04F.6
[SWAPTOOL 2,2,2,1,2,2] (GETS T2 from Bulk reassigns to ATH
M0
G04F.6
[SWAPTOOL 2,1,1,1,1,1] (GETS T1 from Bulk reassigns to ATH
M0
G04F.6
T3
G90G0X15Y15
G91
G01Z-3F200
G01X-5F600
G01Y-3F600
G01X-5F600
G01X-5F600
T2
G90G0X15Y15
G01Z-3F200
G02X0Y012J0F600
T1
G90G0X15Y15
G91
G01Z-3F200
G02X0Y012J0F600
[SWAPTOOL 1,5,5,2,5,5] (GETS T5 from ATH reassigns to Bulk)
M0
G04F.6
[SWAPTOOL 1,4,4,2,4,4] (GETS T4 from ATH reassigns to Bulk)
M0
G04F.6
[SWAPTOOL 1,3,3,2,3,3] (GETS T3 from ATH reassigns to Bulk)
M0
G04F.6
[SWAPTOOL 1,2,2,2,2,2] (GETS T2 from ATH reassigns to Bulk)
M0
G04F.6
[SWAPTOOL 1,1,1,2,1,1] (GETS T1 from ATH reassigns to Bulk)
M0
G04F.6
[SWAPTOOL 2,10,10,1,5,10] (GETS T10 from pos 10 in Bulk reassigns to ATH pos 5)
M0
```

Figure 12

MACHINE TOOL WITH IMPROVED TOOL CHANGER MEANS

This invention relates to CNC machine tools and more particularly to a tool changer for such machines. The invention further contemplates a novel automatic tool changer operable to reduce the cycle times of machining parts requiring the use of different tools to perform various machining operations.

BACKGROUND OF THE INVENTION

In many machining operations performed by conventional CNC machine tools used in the woodworking, plastic and airframe industries, multiple tasks are required to be performed, requiring the use of different tools. Initially, tool changes were performed manually, simply by having the operator interrupt the operation of the machine, change out the tool and then resume operation. Because of the time consuming aspect of manual tool changes, automatic tool changes were developed which generally have involved moving the toolhead to a tool changer positioned on or adjacent the machine or moving the tool changer to the toolhead assembly to effect the tool change. In either of such arrangements, considerable machine motion and time has been required, resulting still in undue cycle times and less than optimal productivity. It thus has been found to be desirable and therefore the principal object of this invention to provide a tool changer for a CNC machine tool in which tool changes may be performed with minimal movement and rapidly, thereby reducing cycle times and correspondingly increasing productivity.

SUMMARY OF THE INVENTION

The present invention overcomes the disadvantages of prior art automatic tool changers by providing a tool changer mountable on the toolhead assembly of a CNC machine tool generally consisting of an array of tool holders pivotally connected to the toolhead assembly and spaced apart relative to the axis of the toolhead spindle, with each of the tool holders being selectively angularly displaceable in a plane including the axis of the spindle between a retracted position and an extended position aligning the tool holder for loading or unloading a tool with respect to the spindle. Through the use of the collet on the end of the toolhead spindle, various tools may not only be loaded and unloaded unto and off of the spindle but may be transferred between the tool holder assembly mounted on the toolhead assembly and tool holders either mounted on other components of the machine or on separate equipment.

DESCRIPTION OF THE PREFERRED EMBODIMENTS

Figure 1:
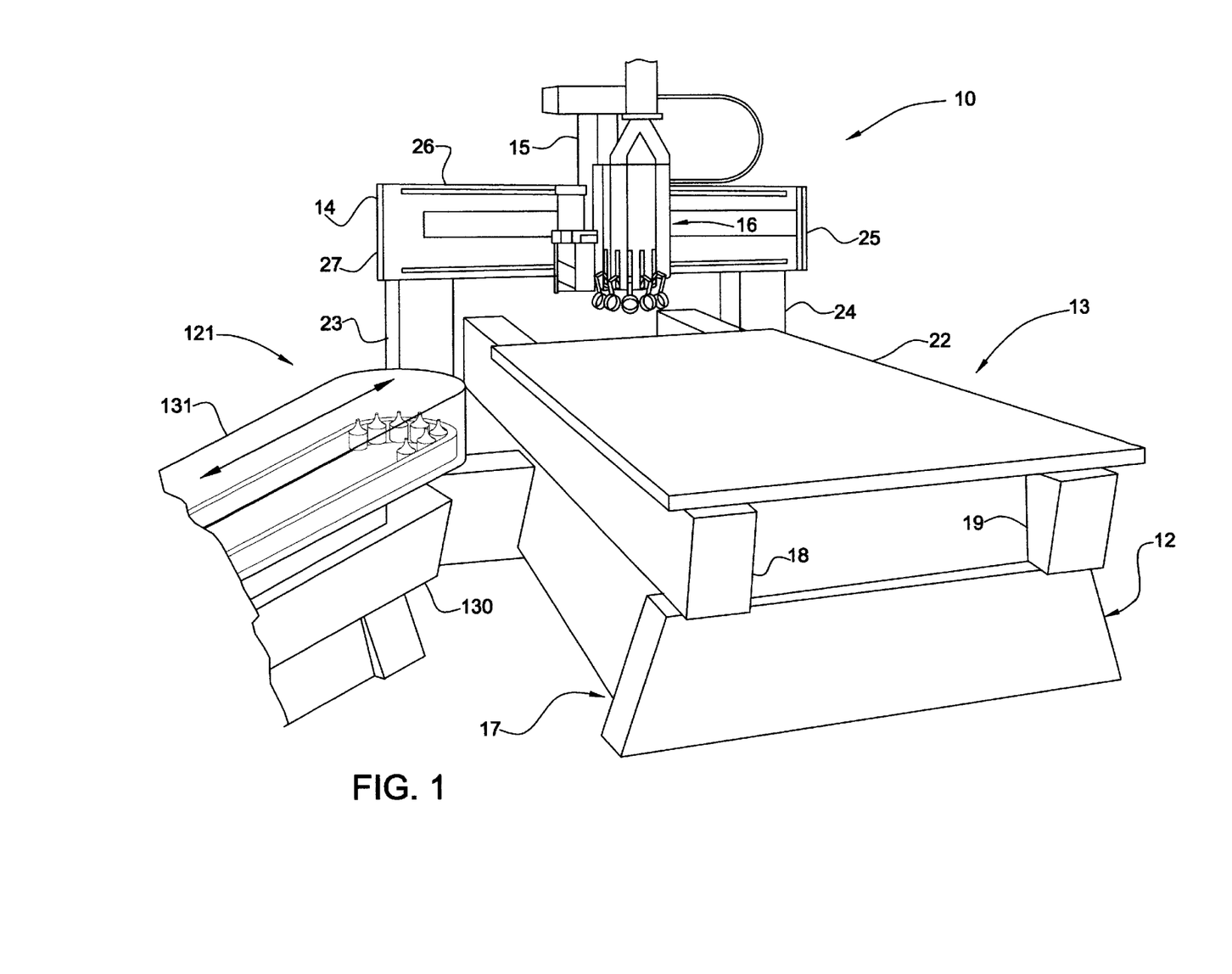
FIG. 1 is a perspective view of a CNC machine tool embodying the present invention, illustrating a portion of a conventional bulk tool changer which comprises a component of another embodiment of the invention.
Figure 2:
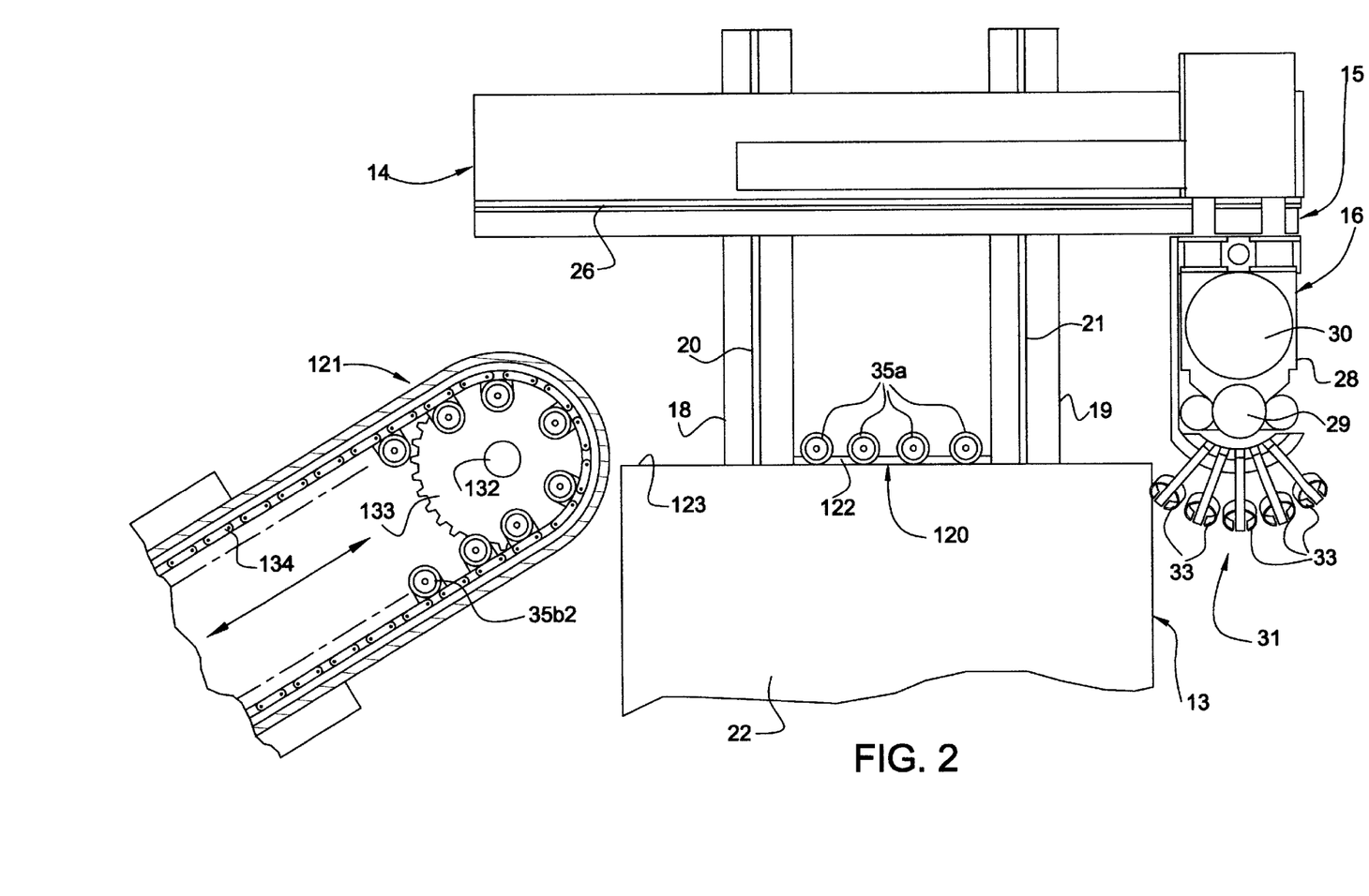
FIG. 2 is a top plan view of the machine tool and bulk tool changer shown in FIG. 1 having portions thereof broken away.
Figure 3:
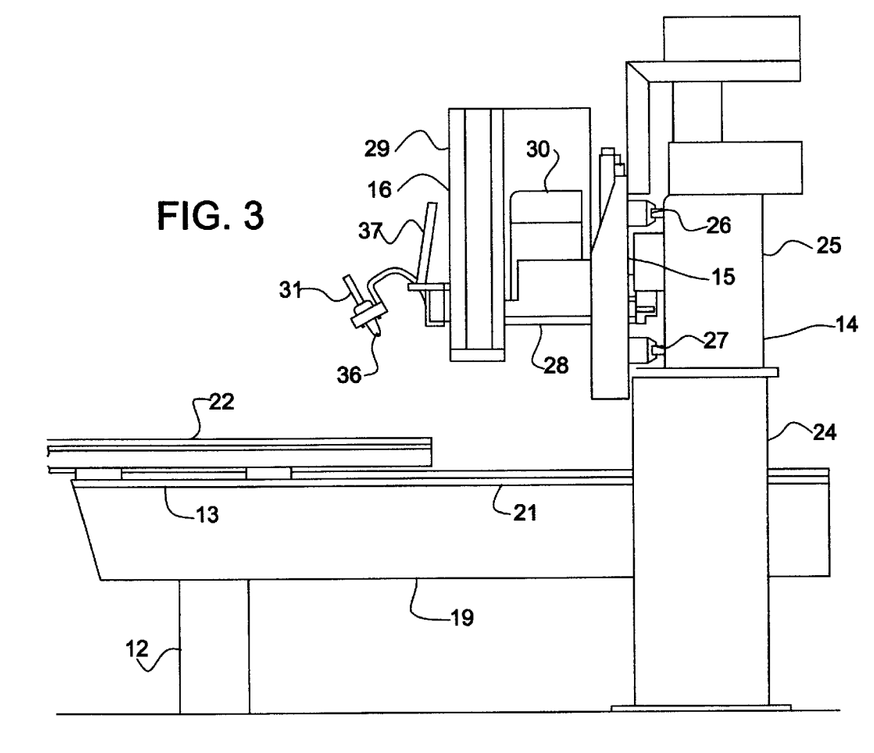
FIG. 3 is a side elevational view of the machine tool shown in FIGS. 1 and 2.

Referring to FIGS. 1 through 3, there is illustrated a CNC machine tool 10 adapted to perform various machining functions on workpieces positioned thereon including routing, drilling, sawing, sanding and the like, and a bulk tool changer 121. The machine generally consists of a base member 12, a movable workpiece support table 13, a gantry 14, a toolhead support assembly 15 and a toolhead assembly 16. The base member includes a lower section 17, a pair of longitudinally disposed, transversely spaced boxed beam sections 18 and 19 and a set of longitudinally disposed, transversely spaced guideways 20 and 21. Table 13 is supported and displaceable longitudinally or along an x-axis or line of travel on guideways 20 and 21, and includes a rectangularly configured workpiece support surface 22.

Gantry 14 includes a pair of leg sections 23 and 24 disposed astride table 13, rigidly connected at their lower ends to base section 17, and a bridge section 25 secured to the upper ends of leg sections 23 and 24, spaced above table 13 and disposed transversely. The front face of bridge section 25 is provided with a pair of transversely disposed, vertically spaced guideways 26 and 27 on which there is mounted and guided, toolhead support assembly 15 for displacement transversely along a y-axis or line of travel. Toolhead assembly 16 similarly is mounted and guided vertically along a z-axis or line of travel on a pair of vertically disposed, transversely spaced guideways mounted on a front face of the toolhead support assembly.

Figures 8, 9:
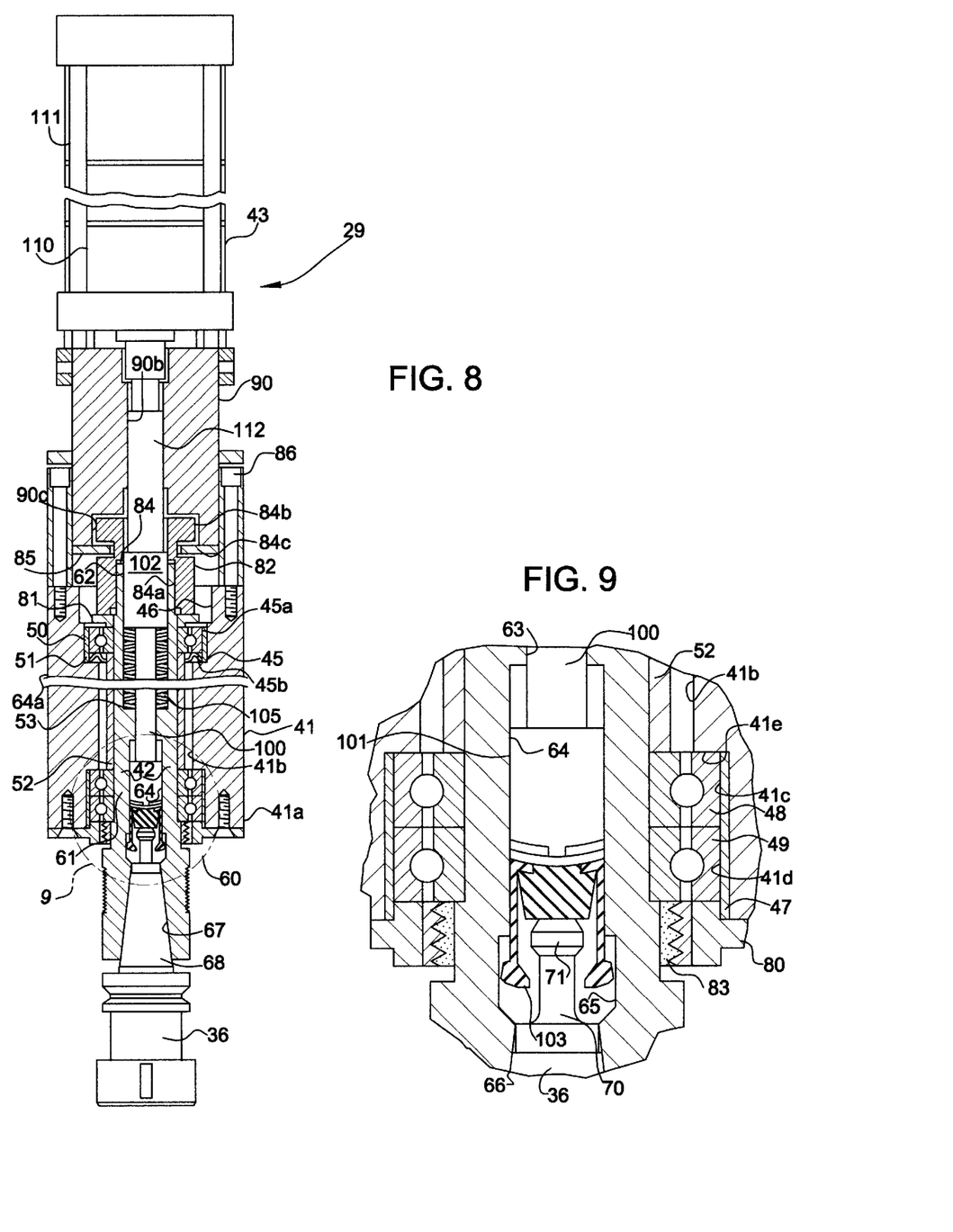
FIG. 8 is an enlarged, vertical cross sectional view of the spindle assembly forming a component of the toolhead assembly shown in FIGS. 1 through 3.
FIG. 9 is an enlarged view of the view shown in FIG. 8, designated by the reference numeral 9.

The toolhead assembly includes a support frame 28 and a spindle assembly 29, a DC servomotor 30 and a tool changer assembly 31 mounted on the support frame. The spindle assembly is best illustrated in FIGS. 8 and 9 and is driven through a belt drive by servomotor 30. Tool changer assembly 31 is best shown in FIGS. 4 through 7. In addition to servomotor 30, the machine is provided with a number of additional DC servomotors for displacing the table along the x-axis, displacing the toolhead support assembly along the y-axis and displacing the toolhead assembly along the z-axis. Such motors are operated by a controller (not shown) pursuant to the execution of a program loaded into the controller in the conventional manner.

Figure 4:
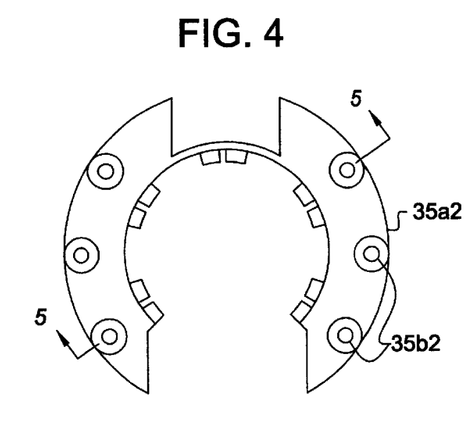
FIG. 4 is an enlarged top plane view of a gripper section of a tool holder comprising a component of the embodiment shown in FIGS. 1 through 3.
Figure 5:
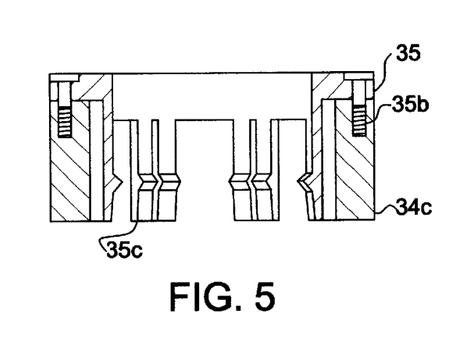
FIG. 5 is a cross sectional view taken along line 5—5 of FIG. 4.
Figures 6, 7:
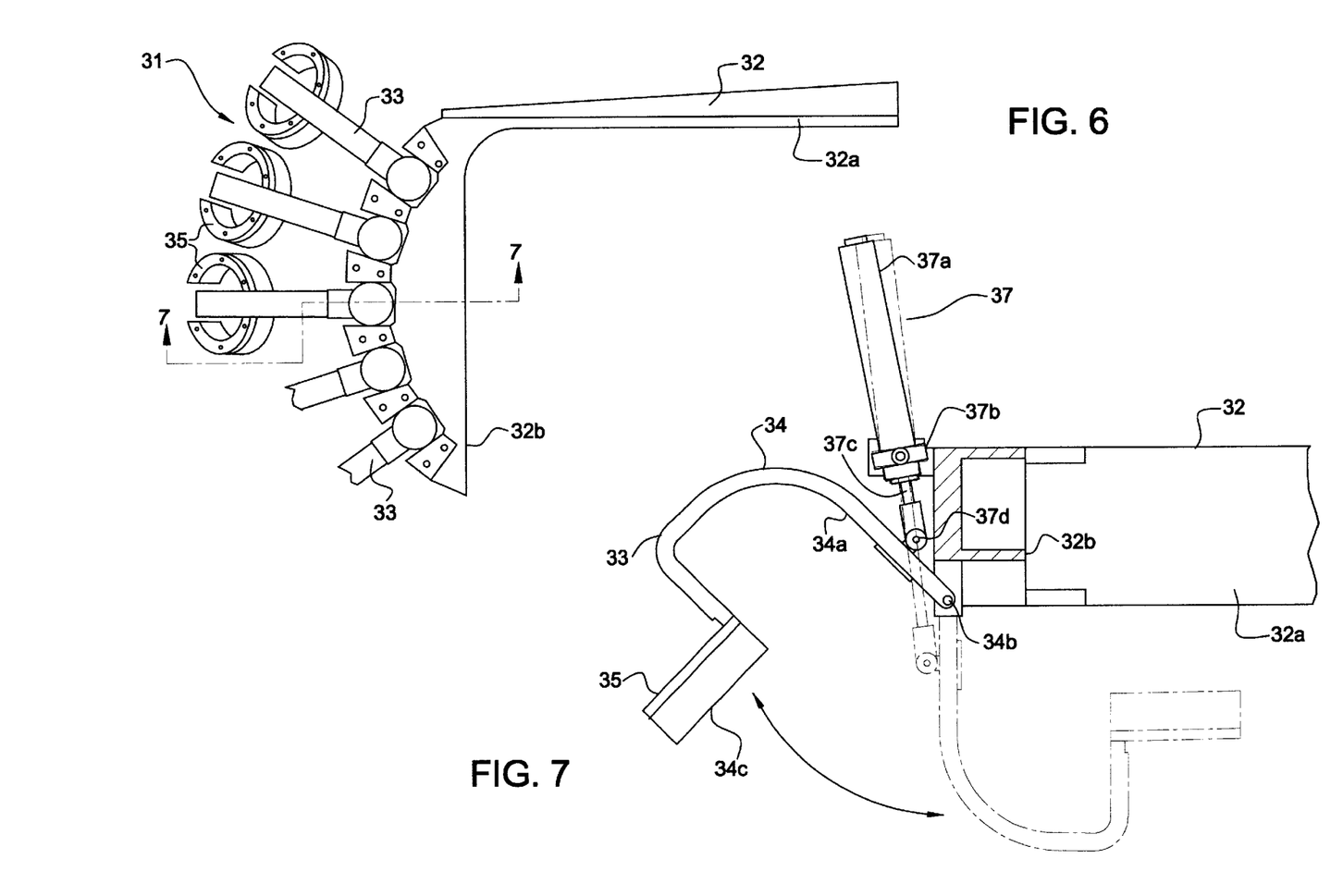
FIG. 6 is an enlarged, top plane view of the tool changer shown in FIGS. 1 through 3, embodying the present invention, having portions thereof broken away.
FIG. 7 is an enlarged cross sectional view taken along line 7—7 in FIG. 6.

As best shown in FIGS. 4 through 7, tool changer assembly 31 includes a support bracket 32 secured to support frame 28, and a plurality of arcuately spaced tool holders 33 pivotally connected to the support bracket. The support bracket includes a base section 32a mounted on the side of the support frame by means of a set of bolts or other suitable means, and disposed longitudinally, extending beyond the front end of the toolhead assembly, and a transversely disposed section 32*b*, spaced from and extending across the front of the assembly, substantially at a right angle relative to the base section. Each of the tool holders consists of an arm section 34 and a gripper section 35. Each arm section 34 has a j-shaped portion 34*a* pivotally connected to bracket section 32*b*, as at 34*b* and an arcuate portion 34*c* formed integrally on the end of the J-shaped portion. As best seen in FIGS. 4 and 5, gripper section 35 includes an arcuate portion 35*a*2 mounted on and secured to arcuate arm portion 34*c* by means of a set of bolts 35*b*, and arcuately spaced sets 3*c* of finger portions extending into the space in arcuate arm portion 34*c* and yieldably biased to engage a tool 36 therebetween as shown in FIG. 3. Each of the tool holders is provided with an air actuated cylinder assembly 37 for pivoting the tool holder between a retracted position as shown in solid lines in FIG. 7 and an extended position as shown in phantom lines in FIG. 7 in which tool gripper section 35 is disposed coaxially with and below a spindle of the toolhead assembly for yielding or accepting a tool relative to the spindle. Each cylinder assembly consists of a cylinder member 37*a* pivotally connected adjacent its rod end to transverse section 32*b* of the support bracket as at 37*b*, and an extendable rod member 37*c* pivotally connected to the arm section of a tool holder as at 37*d*. The various cylinder assemblies are operated by the controller pursuant to the execution of a software program loaded into the controller to selectively extend and retract selected tool holders for loading and unloading tools with respect to the spindle. The configuration of the arm sections and gripper sections of each of the tool holders permits each of the holders to hold and maintain a tool in a retracted position clear of the lower end of the spindle so as not to interfere with any machining operation of the spindle, and an extended position in which the collet of the spindle may grip or release a tool held by the holder. The inwardly biased fingers 3*c* of the gripping portion of each tool holder will yieldingly grip and hold a tool in the tool holder permitting the tool to be retained in the extended position for storage purposes, and displaced from the retracted to the extended position and easily be released or gripped in attaching and detaching the tool with respect to spindle.

Referring to FIGS. 8 and 9, the toolhead assembly includes a spindle assembly 29 generally consisting of a housing 41, a spindle 42 mounted in the housing and a cylinder assembly 43. The housing is provided with a lower section 41*a* and an upper section 41*b*. Housing section 41*a* is provided with a cylindrical bore 41*f* therethrough having a first enlarged section 41*c* at a lower end thereof, a second enlarged section 45 and a third enlarged section 46 at the upper end thereof. Enlarged bore section 41*c* provides a bearing seat including an annular wall 41*d* and an annular seat 41*e*. Enlarged section 45 similarly provides a bearing seat including an annular side wall 45*a* and an annular seating surface 45*b*. Provided in enlarged section 41*c* is a cylindrical sleeve 47 having the outer cylindrical surface thereof adhesively bonded to annular wall 41*d* of the housing. A pair of roller bearings 48 and 49 are seated in enlarged bore section 41*c* with the outer surfaces of the outer races thereof engaging the inner annular surface of cylindrical sleeve 47 and an annular end surface of outer race 48 engaging annular surface 41*e* of enlarged bore section 41*c*. Similarly, a cylindrical sleeve 50 is disposed in enlarged bore section 45 with the outer cylindrical surface thereof adhesively bonded to the annular side wall surface 45*a* of enlarged bore section 45. Disposed within cylindrical sleeve 50 and axially displaceable relative thereto is roller bearing 51. The inner races of bearings 48 and 51 are maintained in axially spaced relation by means of a spacer tube 52. A spring washer 53 is provided between the outer race of bearing 51 and annular surface 45*b* of enlarged bore section 45.

Spindle 42 has a generally tubular configuration and is journaled in lower bearings 48 and 49 and upper bearing 51. Outer cylindrical surface 60 is provided with a recessed cylindrical section 61 providing an annular shoulder on which the inner race of bearing 49 is seated, and an upper threaded portion 62. It further is provided with an axially disposed bore 63 having a lower, first enlarged section 64 and a second enlarged section 65 opening into an end portion 66 provided with a diverging, conically configured wall 67 adapted to receive an upper portion 68 of a tool 36, provided with a complimentary conical surface relative to surface 67. The upper end of the tool is provided with a neck portion 70 and a head portion 71 received within enlarged bore section 64 of the spindle. The upper end of axial bore 63 is provided with an enlarged section 72.

The bearings and the spindle journaled in the bearings are retained within the housing with the bearings seated within enlarged bore sections 41*c* and 45 by means of a lower cover plate 80, a bearing washer 81 and a jam nut 82. Cover plate 80 has an annular configuration and is secured to the bottom end of housing 41 by a set screws. An inner end of plate 80 engages the outer race of bearing 49 and is provided with a seal 83 engaging the spindle about the periphery thereof. Bearing washer 81 also has an annular configuration and has a depending, annular portion which engages the inner race of bearing 51. Jam nut 82 is provided with an axial bore 84 having an enlarged, threaded section 84*a* threaded onto the upper threaded end of the spindle so that it engages bearing washer 81 which bears on the inner race of bearing 51. Outer annular surface 84*b* of the jam nut is provided with an annular recess 84*c* which is adapted to receive a pair semi-circular retaining flanges 85.

Upper housing section 41*b* has a cylindrical configuration and is adapted to seat on and be secured to the upper end of lower housing section 41*a* by means of a set of bolts 86. Such section is axially aligned with axial bore 41*f* of lower housing section 41*a*. Mounted within upper housing section 41*b* is a floating cylinder mount 90 provided with an axially disposed bore 90*a* aligned axially with lower housing bore 41*f* and spindle 42, having a lower enlarged section 90*a* which receives the upper end of jam nut 82. Axial displacement of the cylinder mount is restricted relative to the spindle by means of retainer plates 85 which are secured to the underside of the cylinder mount by means of a set of screws, and project into annular groove 84*c* of jam nut 82.

Axially displaceable in spindle bore 63 is a draw bar 100 having a lower enlarged section 101 disposed in enlarged spindle bore section 64 and an upper enlarged section 102 received in an upper enlarged section 64*a* of spindle bore 63. A collet 103 is provided on the lower end of enlarged draw bar section 101 having a set of fingers which are adapted to cam inwardly when the draw bar is urged in an upward direction to grip head portion 71 of the tool, and to spring apart when the draw bar is moved in a downward direction to release the head portion of the tool. The draw bar is urged into the upper position by means of a set of spring washers 105 disposed between an annular shoulder provided by enlarged spindle bore section 64*a* and a lower cylindrical surface of enlarged draw bar section 102.

Cylinder assembly 43 includes a cylinder 110 retained in a frame 111 secured to the upper end of cylinder mount 90 and a rod member 112 which extends through bore 90b of the cylinder mount in axial alignment with draw bar 100. When rod member 112 is in the retracted position, it will be out of engagement with enlarged draw bar section 102 so that spring washers 105 will urge the draw bar into an upper position causing the fingers of the collet to be cammed inwardly and grip head portion 71 of the tool and correspondingly secure the tool to the spindle for performing a machining function. When the rod member is extended as shown in FIGS. 8 and 9, the rod member will engage and downwardly displace the draw bar against the biasing action of spring washers 105, allowing the fingers of collet 103 to spring apart and thus release the head portion of the tool, allowing it to be removed from the lower end of the spindle. The detachment of rod member 112 from draw bar 100 permits the draw bar to rotate as part of the spindle assembly during machining operations.

In the normal operation of the spindle assembly to perform a machine function, the tool will be received in the lower end of the spindle and firmly gripped by the collet formed on the lower end of draw bar, and the spindle with the tool will be free to rotate relative to the housing, the cylinder mount and the cylinder assembly. When it is desired to change the tool, the spindle drive is discontinued, suitable controls are operated to supply air under pressure to the base of the cylinder 110, to extend rod member 112 into engagement with the draw bar against the biasing actin of spring washers 105, thus causing the collet to displace downwardly and permit the gripping fingers thereof to spring outwardly, releasing the tool. A new tool then may be inserted into the lower end of the spindle and the cylinder assembly operated to allow the draw bar to displace upwardly under the biasing action of the spring washers thus causing the gripping fingers of the collet to be cammed inwardly and grip the upper end of the tool.

Most machining operations on a particular workpiece have been found not to require more than five tools to perform the desired machining operation. Accordingly, up to five tools required by a particular software program to be run may be inserted in one or more of the tool holders carried by the toolhead assembly to perform the desired machining operation. Once the appropriate number of tools have been loaded on the tool changer as described, and the appropriate program has been loaded into the controller of the machine, the controller will execute the program to load and unload the proper tools with respect to the spindle and in the appropriate sequence, the spindle will be stopped and started as required and the toolhead assembly will be displaced along the x, y and z axes to perform the programmed machining operation. Whenever a tool on the spindle is to be changed, the spindle will be stopped, a selected air cylinder will be operated to angularly displace a selected tool holder from the retracted to the extended position below and in axial alignment with the tool attached to the lower end of the spindle to grip the tool, the tool head assembly will be displaced downwardly along the z-axis to position the attached tool in the aligned tool holder permitting the spring biased fingers of the tool holder to grip the tool, cylinder assembly 43 will be operated to extend the draw bar of the spindle assembly to cause the fingers of collet 103 to spring outwardly and release the tool, and the air cylinder for such a tool holder is operated to displace the tool holder from the extended position shown in phantom lines in FIG. 7 to the retracted position as shown in solid lines therein. The machine is then ready to receive another tool carried by the tool changer. Such loading occurs simply by the operation of the cylinder assembly for the other selected tool whereby the tool holder of the selected tool will be caused to be angularly displaced from its retracted position to its extended position, positioning the selected tool below the spindle in axial alignment therewith. The selected tool is then attached to the lower end of the spindle by operating cylinder assembly 43 to allow the collet at the lower end of the spindle to move upwardly, camming the fingers thereof inwardly to grip and thus retain the head portion of the selected tool. The tool head assembly may then be displaced along the z-axis as well as the x and y-axes to continue the machining operation.

Each of tool holders 33 mounted on support bracket 32 is operable to be angularly displaced in a plane including the axis of spindle 42 so that when displaced from its retracted to its extended position, its gripper section 35 will be positioned below and in axial alignment with spindle 42 to permit the relinquishment or receipt of a tool. Such tool changing operation can be performed as the toolhead assembly is displaced along the x, y and/or z-axis of the machine, moving from one coordinate to another. By being capable of effecting a tool change while the toolhead assembly is repositioned, the cycle time of the machining operation being performed is substantially reduced. Furthermore, because of the simple and lightweight construction of the tool holders, the dynamics in the displacement of the toolhead assembly are negligently effected.

In a sense, tool holders 33 resemble and function like the arms of an early typewriter in which an arm corresponding to a certain key would angularly displace and strike a platen upon the key being pressed.

To expand the number of tools that may be used to perform a particular machining operation, the tool changer as described may be used in conjunction with a conventional tool bar 120 mounted on the machine or a conventional bulk tool changer 11 as best shown in FIG. 2. The bar tool changer typically consists of a base plate 122 mounted on the rear edge 123 of the machine table, and a number of transversely spaced tool grippers 35a which are comparable in construction and function to tool grippers 35. By displacement of the machine table along the x-axis and the displacement of the toolhead assembly along the y and z-axes, spindle 42 may be positioned in axial alignment with a selected one of tool grippers 35a to relinquish and receive a tool in the manner as described in connected with tool changer assembly 31. Furthermore, through the use of the collet arrangement on spindle 42, tools may be transferred between any of tool grippers 35 and tool grippers 35a.

Bulk tool changer 121 consists of a separate apparatus which may be positioned adjacent to the machine and operated in cooperation with the toolhead assembly by the controller to accept tools from and provide tools to the spindle of the toolhead assembly. It consists of a base member 130 which is adapted to be positioned adjacent a side of a machine table, close to the gantry, and a carriage 131 mounted on the base member and displaceable longitudinally. Journaled at each end of the carriage is a vertically disposed shaft 132 having a gear 133. An endless chain 134 is trained about each of gears 133 and is provided with a plurality of tool grippers 35b2 spaced along the length thereof. Each of tool grippers 35b2 is similar to each of tool grippers 35 of tool changer assembly 31 and tool grippers 35a of bar tool changer assembly 120, and may be positioned below and in axial alignment with spindle 42 of the toolhead assembly. The bulk tool changer is provided with various drives for longitudinally displacing the carriage thereof and rotating a gear shaft 132 to index the tool grippers, thus permitting a selected one of tool grippers 35b2 to be positioned at a location where spindle 42 of the toolhead assembly may be positioned in axial alignment therewith.

The toolhead assembly may be used in conjunction with the bulk tool changer assembly to either change a tool as between spindle 42 and the bulk tool changer or transfer one or more tools between the bulk tool changer and toolhead mounted tool changer 31. This is accomplished merely by operating the controls of the bulk tool changer to displace the carriage thereof and index the chained conveyor to position a selected tool thereon to a selected position, and then operating other machine controls to displace the toolhead assembly so that spindle 42 may be displaced to a position above and in axial alignment with a tool retained by a tool gripper of the bulk tool transfer assembly at the selected position. The cylinder assembly of the spindle may then be operated to cause the collet component of the spindle to grip the selected tool in the manner previously described. If the tool thus retrieved from the bulk tool changer assembly is to be transferred to a tool holder of tool changer assembly 31, the selected one of the tool holders of such assembly is then operated to transfer the tool from the spindle to the selected tool holder.

Tool changer assembly 31 may be used independently or in conjunction with one or both of bar tool changer assembly 120 and bulk tool changer assembly 121 to provide a greater availability of tools and a minimum amount of cycle time in the performance of a machining operation. The arrangement further permits a program used to operate the machine to be devised in a manner whereby prior to the execution of the machining function with respect to a particular workpiece, the machine will be caused to select the appropriate tools from either or both of the bar or bulk tool changer assemblies and mount them on the toolhead mounted tool changer assembly. Such preliminary routine would be repeated upon each new machining procedure.

To minimize the effects of the additional mass possibly adversely affecting the dynamics of the movement of the toolhead assembly, the components of a tool changer assembly 31 are formed of a lightweight materials such as aluminum, plastic and perhaps lightweight composite materials. Any form of gripping device may be utilized allowing for the proper gripping, retaining and releasing of the various tools used with the assembly.

Figure 10:
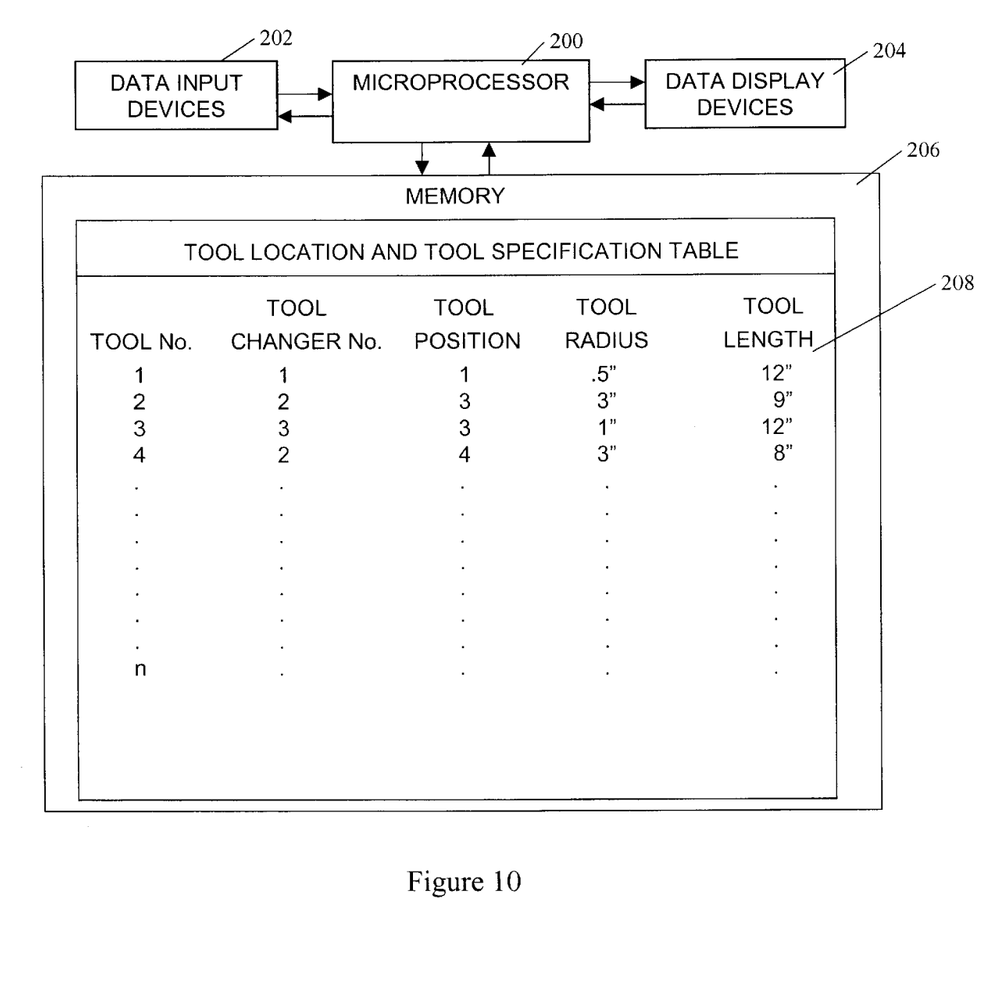
FIG. 10 is a diagram of a computer controller with a memory having a tool location and tool specification table.
Figure 11:
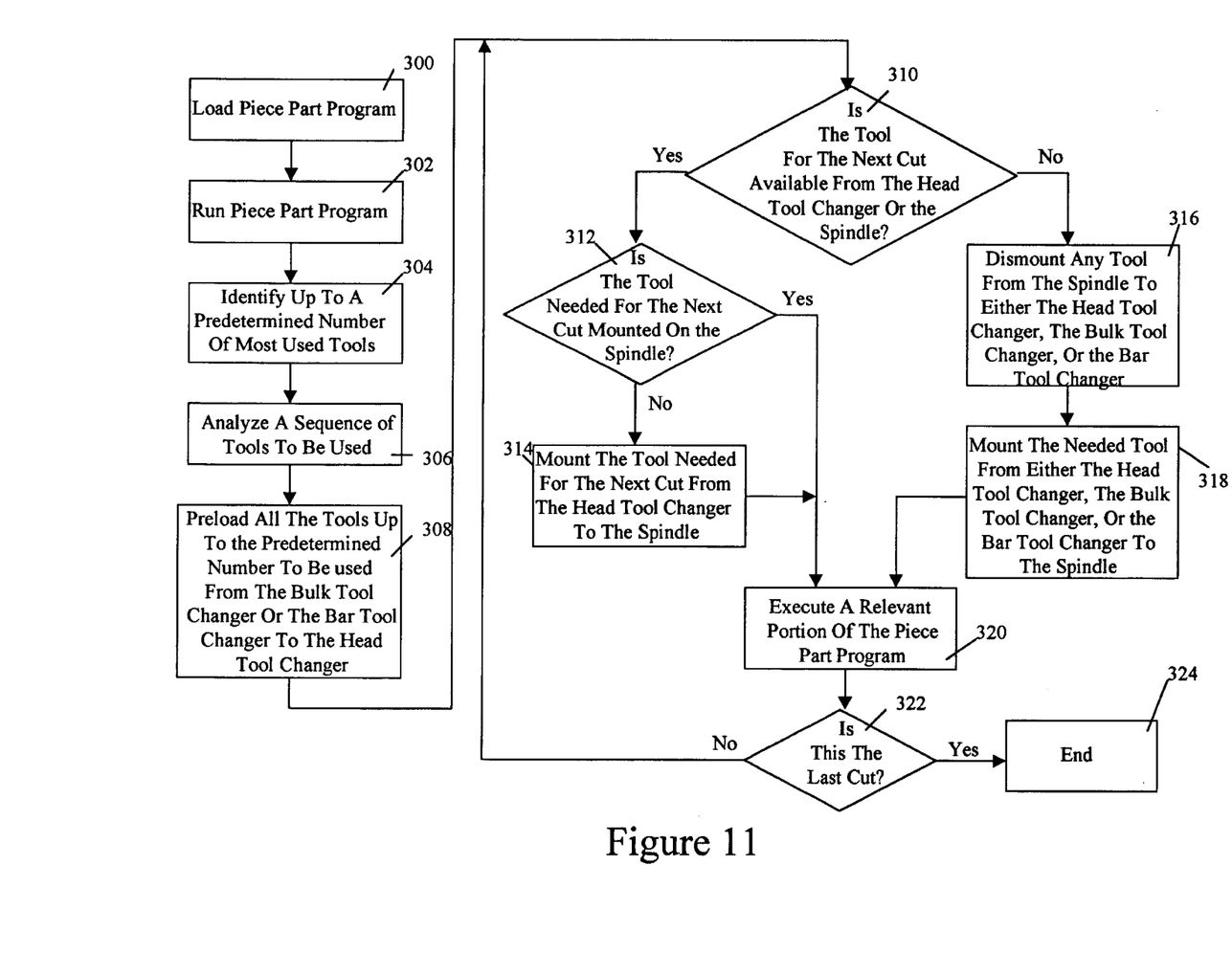
FIG. 11 is a diagram illustrating the logical steps of relocating tools among a bulk tool changer, a bar tool changer, a head tool changer and a spindle in implementing a piece part program.
Figure 12:
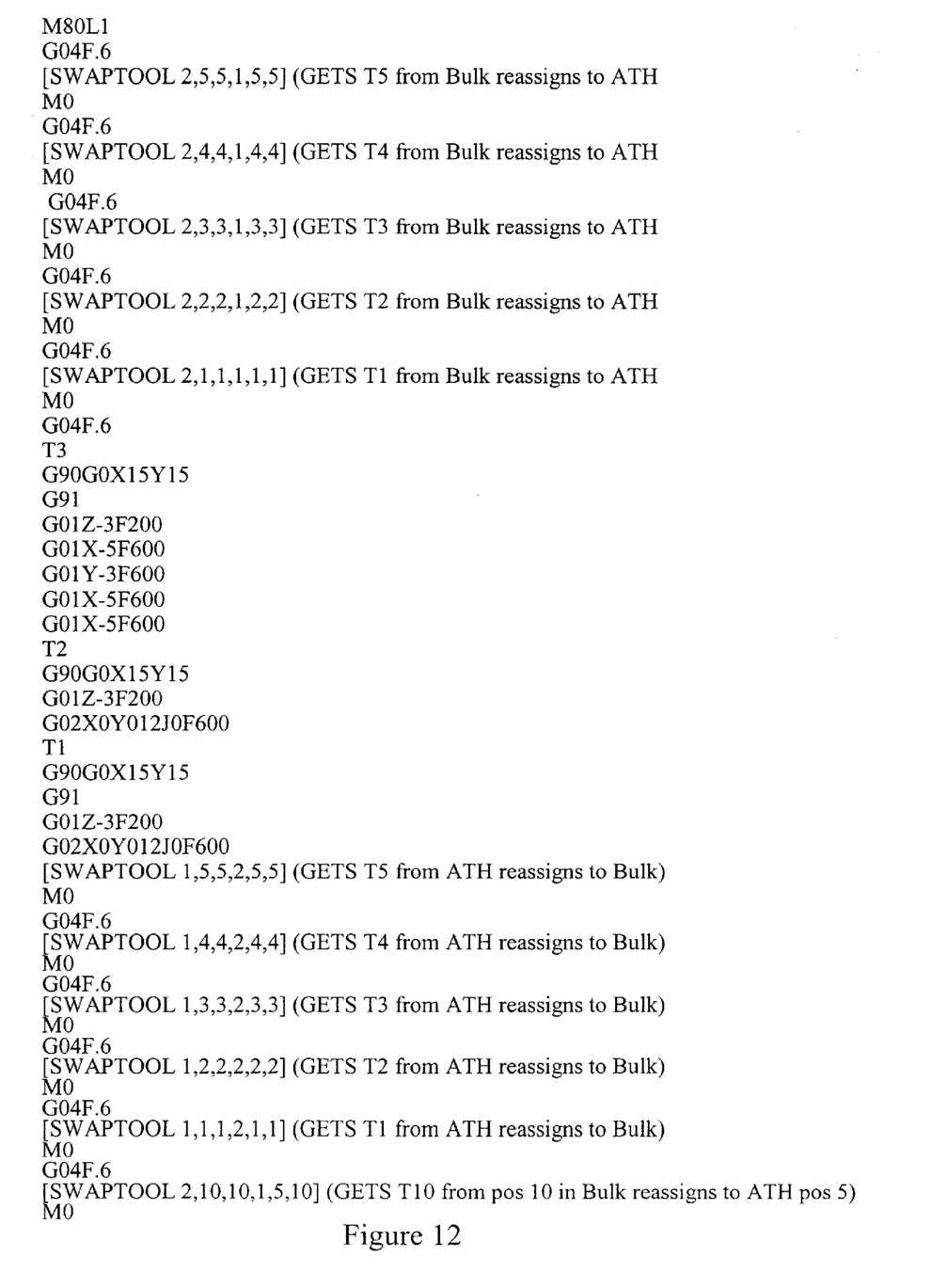
FIG. 12 is a short sample computer program.

More specifically regarding the overall control of swapping tools between the Bulk Tool Changer 121, the Bar Tool Changer 120, the Head Tool Changer 31 and the Spindle Assembly 29, they are shown in FIGS. 10, 11 and 12.

FIG. 10 shows a computer comprising a microprocessor 200 connected to any number of data input devices 202, any number of data display devices 204 and any number of memories 206. The data input devices 202 can be a mouse, a keyboard, a probe, and a microphone for voice recognition. The data display devices can be a CRT monitor, a flat panel display monitor, or any other known display devices. The memory 206 can be a hard disk, a network memory device, a floppy disk, a semiconductor based memory device, an optical based memory device or any other known memory devices. As a whole, the computer can be that of Thermwood Controller Model No. 91000 series and Thermwood Controller Model No. 9100 series.

The memory 206 comprises a table 208 containing tool location and tool specification information. The table is organized using tool numbers as the basic reference system. Each tool is assigned a specific tool number, which tool number corresponds to a specific address location having a designated amount of memory space. Each memory space is divided into four categories respectively for a tool changer number, a tool position number, a tool radius information and a tool length information.

As has been mentioned hereinabove, the present invention swaps tools from the bulk tool changer, the bar tool changer and the head tool changer. These tool changers are each designated with a unique number. For example, the bulk tool changer may be designated as 2, the bar tool changer may be designated as 3 and the head tool changer may be designated a 1.

Since each of the three tool changers contain multiple tool storage positions, the table 208 also contain a category for storing a tool position number so as to track the whereabouts of a tool on a specific tool changer.

For the purpose of keeping record of the specification of each tool, the table 208 also contains tool radius information and tool length information of each tool.

Therefore, based on FIG. 10, tool number 1 is stored in tool changer number 1, which is a head tool changer, at tool position number 1. This tool has a radius of 0.5 inches and a length of 12 inches. Similarly, tool 2 is stored in tool changer number 2, which is a bulk tool changer, at tool position number 3. This tool has a radius of 3 inches and a length of 9 inches.

In the event that a tool is relocated from one tool changer to another, only the tool changer number and the tool position number of the relevant tool is changed in the table 208. This table conveniently tracks the location and specification of all tools.

FIG. 11 shows a logic diagram of a computer program for implementing the swapping of tools between the Bulk Tool Changer 121, the Bar Tool Changer 120, the Head Tool Changer 31 and the Spindle Assembly 29. As has been mentioned hereinabove, with tool changers, there is no need for an operator to manually change any tools. All an operator needs to do is to load a piece part program in the computer comprising the CPU 200 with memory 202 as shown in step 300. Once the program is properly loaded, run the piece part program as shown in step 302. The computer runs the program and identifies up to a predetermined number of most used tools in the program as shown in step 304. In the present invention, the predetermined number has been earlier determined to be 5 as an example. The computer then analyzes the program to determine a sequence of tools to be used as shown in step 306. All most used tools up to the predetermined number are then loaded from either the Bulk Tool Changer 121 or the Bar Tool Changer 120 to the Head Tool Changer 31 as shown in step 308. Right before any cuts are made, there is a determination of whether a tool needed for the next cut are available from the Head Tool Changer 31 or the Spindle Assembly 29 as shown in step 310. If yes, a further determination of whether the tool needed for the next cut is mounted on the spindle as shown in step 312. If yes, then the machine implements a relevant portion of the piece part program as shown in step 320. However, if the answer is no at step 312, then the tool needed for the next cut is mounted from the Head Tool Changer 31 to the Spindle Assembly 29 as shown in step 314. Thereafter, a cut is made at step 320.

If a determination at step 310 is no, then whatever tool that remains mounted on the Spindle Assembly 29 is dismounted to either the Head Tool Changer 31, the Bulk Tool Changer 121 or the Bar Tool Changer 120, as shown in step 316. A tool needed for the next cut is mounted onto the Spindle Assembly 29 from either the Head Tool Changer 31, the Bulk Tool Changer 121 or the Bar Tool Changer 120, as shown in step 318. A cut is then made at step 320.

At step 322, a determination is made regarding whether an immediately finished cut is a last cut in the piece part program. If yes, the program is terminated, as shown in step 324. If not, then steps 310 to 320 are repeated until all cuts are made.

FIG. 12 shows a sample computer program implementing a portion of the piece part program of FIG. 11. More specifically, this program relocates five tools from the Bulk Tool Changer 121 to the Head Tool Changer 31, uses the tools to implement some cuts, then relocates, the five tools from the Head Tool Changer 31 back to the Bulk Tool Changer 121.

In the command as shown in line 12, the following command is found:

[SWAPTOOL 2,5,5,1,5,5] (Gets T5 from Bulk reassigns to ATH).

The SWAPTOOL command is for the purpose of relocating tools between two locations. The first number is designated as a target tool changer number. In this example, 2 would represent the Bulk Tool Changer 121. The second number is designated as a target address number indicating where a tool resides in the Bulk Tool Changer 121. The third number is designated as a tool identification number to correctly identify the type of tool. The fourth number is designated as a destination tool changer number. In this example, 1 represents the Head Tool Changer 31. The fifth number is designated as a destination address number indicating where the tool will be stored. Finally, the sixth number is designated as a tool identification number indicating what type of tool has been stored at the destination location. The texts within the parenthesis are merely remarks of the command to help programmers who need to know the purpose of the command.

As shown, there are five such types of commands in this program between lines 10 and 24. Therefore, five tools are relocated from the Bulk Tool Changer 121 to the Head Tool Changer 31.

Between lines 27 and 39, specific cutting commands using tool numbers 3, 2, and 1 are shown. For each tool, there are specific directions for each axis, the distance to be cut and the feed rate of the tool. Between lines 44 and 59, the commands of returning all tools from the Head Tool Changer 31 back to the Bulk Tool Changer 121 are shown.

Although the invention has been described in the context of a CNC machine tool utilizing a moveable table and a stationary gantry, it is contemplated within the scope of the invention may be used with a CNC machine provided with a stationary table and a moveable gantry. In either of such arrangements, it further is contemplated that the toolhead mounted tool changer assembly as described may be used independently or in conjunction with either or both a bar tool changer assembly and a bulk tool transfer assembly as described.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. In a system including a machine operable to perform a process; a controller including a memory, operable to execute a program to cause said machine to perform said process; a tool head assembly mounted on said machine provided with a spindle and a first means for storing a selected number of tools, operable for selectively displacing each of said tools thereof between a storage position and a position for transfer of said tools to and from said spindle; and second means for storing a selected number of tools, the second storing means being accessible by said spindle such that said tools can be transferred between said second storing means and said spindle, a method comprising:
   storing in the memory the site of each of said tools relative to one of said first and second storing means and said spindle;
   loading a program into the controller, executable to cause said machine to perform a process;
   executing said program including:
      identifying the tools most used to perform said process;
      transferring each non-identified tool located on said first storing means and said spindle from said first storing means and said spindle to said second storing means;
      recording in the memory the new site of said non-identified tools;
      transferring each of said identified tools located on said second storing means to one of said first storing means and said spindle; and
      recording in the memory the new sites of said identified tools.

2. The method according to claim 1 including storing in the memory data corresponding to the position of each of the tools in each of said storing means.

3. The method according to claim 2 including storing in the memory data corresponding to a radius of each of said tools in each of said storing means and spindle.

4. The method according to claim 3 including storing in the memory data corresponding to a length of each of said tools in each of said storing means and spindle.

5. The method of claim 1 wherein said controller operates to track each of said tools by a tool number, by which of the storing means contains each tool, by the position in said storing means, and by a radius and a length.

6. The method according to claim 1 wherein said first storing means comprises a plurality of tool holders each displaceable between a storage position and a position wherein a tool supported thereon may be transferred to and from said spindle.

7. The method according to claim 1 wherein said second storing means is mounted on said machine.

8. The method according to claim 7 wherein said second storing means comprises a tool bar changer mounted on a worktable of said machine.

9. The method according to claim 1 wherein said second storing means is detached from said machine.

10. The method according to claim 1 wherein said process includes segments which require tools, including:
    determining prior to each segment of said process whether the required tool for said segment is mounted on said spindle;
    identifying the site of said required tool;
    dismounting any non-required tool mounted on said spindle;
    transferring said dismounted tool to a site on one of said storing means;
    transferring said required tool from one of said storing means to said spindle; and
    recording the site of said non-required tool in the memory.

11. In a system including a machine operable to perform a process; a controller including a memory operable to execute a program to cause said machine to perform said process; a tool head assembly mounted on said machine provided with a spindle and a first means for storing a selected number of tools, operable for selectively displacing each of said tools thereof between a storage position and a position for transfer of said tools to and from said spindle; and second means for storing a selected number of tools, the second storing means being accessible by said spindle such that said tools can be transferred between said second storing means and said spindle, a method comprising:

storing in the memory the site of each of said tools in one of said first and second storing means and said spindle;

loading a program executable to cause said machine to perform said process in said controller;

executing said program including:

identifying the highest number of tools required to perform said process, which may be accommodated by said first storing means;

transferring each non-identified tool located on said first storing means and said spindle from said first storing means and said spindle to said second storing means;

recording in the memory the new site of said non-identified tools;

transferring each of said identified tools located on said second storing means to one of said first storing means and said spindle; and recording in the memory the new sites of said identified tools.

12. The method according to claim 11 including storing in the memory data corresponding to the positions of each tool in each of said storing means.

13. The method according to claim 12 including storing in the memory data corresponding to a radius of each of said tools in each of said storage means.

14. The method according to claim 11 including storing in the memory data corresponding to a length of each of said tools in each of said storage means.

15. The method according to claim 11 wherein said controller is operable to track each of said tools by a tool number, by which of the storing means contains each tool be the position in said storing means, and by a radius and a length.

16. The method according to claim 11 wherein said first storing means comprises a plurality of tool holders, each displaceable between a storage position and a position wherein a tool held therein may be transferred to and from said spindle.

17. The method according to claim 11 wherein said second storing means is mounted on said machine.

18. The method according to claim 17 wherein said second storing means comprises a tool bar changer mounted on a worktable on said machine.

19. The method according to claim 11 wherein said second storing means is detached from said machine.

20. The method according to claim 11 wherein said process includes segments which require tools, including:

determining prior to each segment of said process whether the required tool for said segment is mounted on said spindle;

identifying the site of said required tool;

dismounting any non-required tool mounted on said spindle;

transferring said dismounted tool to a site on one of said storing means;

transferring said required tool from one of said storing means to said spindle; and recording the site of said non-required tool in the memory.

* * * * *